United States Patent
Thomaschefsky et al.

(10) Patent No.: US 7,645,353 B2
(45) Date of Patent: Jan. 12, 2010

(54) ULTRASONICALLY LAMINATED MULTI-PLY FABRICS

(75) Inventors: Craig Farrell Thomaschefsky, Marietta, GA (US); Larry M. Brown, Roswell, GA (US)

(73) Assignee: Kimberly-Clark Worldwide, Inc., Neenah, WI (US)

(*) Notice: Subject to any disclaimer, the term of this patent is extended or adjusted under 35 U.S.C. 154(b) by 0 days.

(21) Appl. No.: 10/745,339

(22) Filed: Dec. 23, 2003

(65) Prior Publication Data

US 2005/0136778 A1 Jun. 23, 2005

(51) Int. Cl.
*B32B 37/00* (2006.01)

(52) U.S. Cl. .................. 156/73.1; 156/290; 156/308.4; 156/324

(58) Field of Classification Search ............ 156/73.1, 156/308.2, 308.4, 324, 580.1, 580.2, 73.2, 156/290

See application file for complete search history.

(56) References Cited

U.S. PATENT DOCUMENTS

| | | |
|---|---|---|
| 1,301,605 A | 4/1919 | Ringel |
| 2,014,460 A | 9/1935 | Alm |
| 2,069,778 A | 2/1937 | Rowe |
| 2,666,369 A | 1/1954 | Niks |
| 3,338,992 A | 8/1967 | Kinney |
| 3,341,394 A | 9/1967 | Kinney |
| 3,485,706 A | 12/1969 | Evans |
| 3,494,821 A | 2/1970 | Evans |
| 3,502,538 A | 3/1970 | Peterson |
| 3,502,763 A | 3/1970 | Hartman |
| 3,542,615 A | 11/1970 | Dobo et al |
| 3,597,299 A | 8/1971 | Thomas et al. |
| 3,692,618 A | 9/1972 | Dorschner et al. |
| 3,775,231 A | 11/1973 | Thomas |
| 3,802,817 A | 4/1974 | Matsuki et al. |
| 3,821,068 A | 6/1974 | Shaw |
| 3,844,869 A | 10/1974 | Rust, Jr. |
| 3,849,241 A | 11/1974 | Butin et al. |
| 3,855,046 A | 12/1974 | Hansen et al. |
| 3,879,257 A | 4/1975 | Gentile et al. |
| 3,914,365 A | 10/1975 | Kim et al. |
| 3,939,033 A | 2/1976 | Grgach et al. |
| 3,949,128 A | 4/1976 | Ostermeier |
| 3,953,638 A | 4/1976 | Kemp |

(Continued)

FOREIGN PATENT DOCUMENTS

CA 2165107 6/1996

(Continued)

OTHER PUBLICATIONS

Abstract of Japanese Patent No. 10072753, Mar. 17, 1998.

(Continued)

*Primary Examiner*—James Sells
(74) *Attorney, Agent, or Firm*—Dority & Manning, P.A.

(57) ABSTRACT

A multi-ply fabric is provided that includes an inner ply positioned between two outer plies that contain both thermoplastic fibers and absorbent staple fibers. The plies are ultrasonically bonded together. The material used to form the inner ply may be selectively controlled to optimize certain properties of the fabric for a particular application, such as strength, bulk, absorption capacity, absorption rate, handfeel, etc.

19 Claims, 3 Drawing Sheets

U.S. PATENT DOCUMENTS

| | | |
|---|---|---|
| 4,100,324 A | 7/1978 | Anderson et al. |
| 4,107,374 A | 8/1978 | Kusunose et al. |
| 4,144,370 A | 3/1979 | Boulton |
| 4,145,468 A | 3/1979 | Mizoguchi et al. |
| 4,165,556 A | 8/1979 | Nishida et al. |
| 4,239,720 A | 12/1980 | Gerlach et al. |
| 4,259,399 A | 3/1981 | Hill |
| 4,307,143 A | 12/1981 | Meitner |
| 4,340,563 A | 7/1982 | Appel et al. |
| 4,365,466 A | 12/1982 | Horiuchi et al. |
| 4,369,156 A | 1/1983 | Mathes et al. |
| 4,374,888 A | 2/1983 | Bornslaeger |
| 4,460,699 A | 7/1984 | Convers et al. |
| 4,476,186 A | 10/1984 | Kato et al. |
| RE31,885 E | 5/1985 | Meitner |
| 4,519,804 A | 5/1985 | Kato et al. |
| 4,587,154 A | 5/1986 | Hotchkiss et al. |
| 4,612,228 A | 9/1986 | Kato et al. |
| 4,735,849 A | 4/1988 | Murakami et al. |
| 4,774,110 A | 9/1988 | Murakami et al. |
| 4,795,122 A | 1/1989 | Petre |
| 4,795,668 A | 1/1989 | Krueger et al. |
| 4,808,467 A | 2/1989 | Suskind et al. |
| 4,833,012 A | 5/1989 | Makimura et al. |
| 4,879,170 A | 11/1989 | Radwanski et al. |
| 4,931,355 A | 6/1990 | Radwanski et al. |
| 4,965,122 A | 10/1990 | Morman |
| 4,981,747 A | 1/1991 | Morman |
| 5,026,587 A | 6/1991 | Austin et al. |
| 5,057,368 A | 10/1991 | Largman et al. |
| 5,069,970 A | 12/1991 | Largman et al. |
| 5,096,532 A | 3/1992 | Neuwirth et al. |
| 5,108,820 A | 4/1992 | Kaneko et al. |
| 5,110,403 A | 5/1992 | Ehlert |
| 5,136,761 A | 8/1992 | Sternlieb et al. |
| 5,137,600 A | 8/1992 | Barnes et al. |
| 5,151,320 A | 9/1992 | Homonoff et al. |
| 5,162,074 A | 11/1992 | Hills |
| 5,198,292 A | 3/1993 | Lerner et al. |
| 5,204,703 A | 4/1993 | Hutchinson et al. |
| 5,219,633 A | 6/1993 | Sabee |
| 5,223,319 A | 6/1993 | Cotton et al. |
| 5,226,992 A | 7/1993 | Morman |
| 5,254,399 A | 10/1993 | Oku et al. |
| 5,258,220 A | 11/1993 | Joseph |
| 5,277,976 A | 1/1994 | Hogle et al. |
| 5,281,463 A | 1/1994 | Cotton |
| 5,284,703 A | 2/1994 | Everhart et al. |
| 5,290,628 A | 3/1994 | Lim et al. |
| 5,328,759 A | 7/1994 | McCormack et al. |
| 5,336,545 A | 8/1994 | Morman |
| 5,336,552 A | 8/1994 | Strack et al. |
| 5,350,624 A | 9/1994 | Georger et al. |
| 5,355,565 A | 10/1994 | Baravian |
| 5,364,680 A | 11/1994 | Cotton |
| 5,366,793 A | 11/1994 | Fitts, Jr. et al. |
| 5,382,400 A | 1/1995 | Pike et al. |
| 5,389,202 A | 2/1995 | Everhart et al. |
| 5,393,599 A | 2/1995 | Quantrille et al. |
| 5,413,811 A | 5/1995 | Fitting et al. |
| 5,460,884 A * | 10/1995 | Kobylivker et al. ......... 428/373 |
| 5,466,410 A | 11/1995 | Hills |
| 5,498,232 A | 3/1996 | Scholz |
| 5,509,430 A | 4/1996 | Berger |
| D369,907 S | 5/1996 | Sayovitz et al. |
| 5,534,340 A | 7/1996 | Gupta et al. |
| 5,543,206 A * | 8/1996 | Austin et al. ................ 428/198 |
| 5,552,013 A * | 9/1996 | Ehlert et al. ................ 156/555 |
| 5,573,719 A | 11/1996 | Fitting |
| 5,573,841 A | 11/1996 | Adam et al. |
| 5,575,874 A | 11/1996 | Griesbach, III et al. |
| 5,587,225 A | 12/1996 | Griesbach et al. |
| 5,607,798 A | 3/1997 | Kobylivker et al. |
| 5,614,281 A | 3/1997 | Jackson et al. |
| 5,620,779 A | 4/1997 | Levy et al. |
| 5,635,290 A | 6/1997 | Stopper et al. |
| 5,643,240 A | 7/1997 | Jackson et al. |
| 5,647,883 A | 7/1997 | Houpt et al. |
| 5,652,051 A | 7/1997 | Shawver et al. |
| 5,704,101 A | 1/1998 | Majors et al. |
| 5,707,468 A | 1/1998 | Arnold et al. |
| D390,708 S | 2/1998 | Brown |
| 5,718,972 A | 2/1998 | Murase et al. |
| 5,719,219 A | 2/1998 | Shah et al. |
| 5,733,635 A | 3/1998 | Terakawa et al. |
| 5,759,926 A | 6/1998 | Pike et al. |
| 5,770,309 A | 6/1998 | Houpt et al. |
| 5,780,369 A | 7/1998 | Allison et al. |
| 5,783,503 A | 7/1998 | Gillespie et al. |
| 5,785,179 A | 7/1998 | Buczwinski et al. |
| 5,801,107 A | 9/1998 | Everhart et al. |
| 5,810,954 A | 9/1998 | Jacobs et al. |
| 5,814,390 A | 9/1998 | Stokes et al. |
| 5,817,199 A | 10/1998 | Brennecke et al. |
| 5,840,633 A | 11/1998 | Kurihara et al. |
| 5,853,635 A | 12/1998 | Morell et al. |
| 5,853,859 A | 12/1998 | Levy et al. |
| 5,858,504 A | 1/1999 | Fitting |
| 5,858,515 A | 1/1999 | Stokes et al. |
| 5,885,909 A | 3/1999 | Rudisill et al. |
| 5,895,710 A | 4/1999 | Sasse et al. |
| 5,914,084 A | 6/1999 | Benson et al. |
| 5,935,512 A | 8/1999 | Haynes et al. |
| 5,935,883 A | 8/1999 | Pike |
| 5,962,112 A | 10/1999 | Haynes et al. |
| 5,964,351 A | 10/1999 | Zander |
| 5,965,084 A | 10/1999 | Nishijima |
| 5,968,855 A | 10/1999 | Perdelwitz, Jr. et al. |
| 5,979,030 A | 11/1999 | Legare |
| 5,993,944 A | 11/1999 | Honna et al. |
| 6,004,673 A | 12/1999 | Nishijima |
| 6,022,818 A | 2/2000 | Welchel et al. |
| 6,030,331 A | 2/2000 | Zander |
| 6,063,717 A | 5/2000 | Ishiyama et al. |
| 6,069,097 A | 5/2000 | Suzuki et al. |
| 6,080,466 A | 6/2000 | Yoshimura et al. |
| D428,267 S | 7/2000 | Romano, III et al. |
| 6,093,665 A | 7/2000 | Sayovitz et al. |
| D428,710 S | 8/2000 | Romano, III et al. |
| 6,103,061 A | 8/2000 | Anderson et al. |
| 6,107,268 A | 8/2000 | Yahiaoui et al. |
| 6,110,848 A | 8/2000 | Bouchette |
| 6,114,263 A | 9/2000 | Benson et al. |
| 6,136,775 A | 10/2000 | Strout et al. |
| 6,150,002 A | 11/2000 | Varona |
| 6,158,614 A | 12/2000 | Haines et al. |
| 6,187,699 B1 | 2/2001 | Terakawa et al. |
| 6,197,404 B1 | 3/2001 | Varona |
| 6,200,669 B1 | 3/2001 | Marmon et al. |
| 6,258,196 B1 | 7/2001 | Suzuki et al. |
| 6,264,776 B1 | 7/2001 | DiPalma |
| 6,269,969 B1 | 8/2001 | Huang et al. |
| 6,269,970 B1 | 8/2001 | Huang et al. |
| 6,273,359 B1 | 8/2001 | Newman et al. |
| 6,314,627 B1 | 11/2001 | Ngai |
| 6,315,864 B2 | 11/2001 | Anderson et al. |
| 6,325,864 B1 | 12/2001 | Zahuranec et al. |
| 6,375,889 B1 | 4/2002 | Holmes et al. |
| 6,381,817 B1 | 5/2002 | Moody, III |
| 6,460,233 B2 | 10/2002 | Noelle |
| 6,461,729 B1 | 10/2002 | Dugan |
| 6,502,288 B2 | 1/2003 | Black et al. |
| 6,635,135 B2 * | 10/2003 | Kuen et al. .................. 156/199 |
| 6,638,605 B1 * | 10/2003 | Ankuda et al. .............. 428/198 |

| | | | |
|---|---|---|---|
| 6,723,669 B1 | 4/2004 | Clark et al. | |
| 6,797,226 B2 | 9/2004 | Annable | |
| 2001/0008180 A1 | 7/2001 | Anderson et al. | |
| 2001/0037850 A1 | 11/2001 | Marmon et al. | |
| 2002/0006502 A1 | 1/2002 | Nagaoka et al. | |
| 2002/0015069 A1 | 2/2002 | Yamamoto et al. | |
| 2002/0034907 A1 | 3/2002 | Groitzsch et al. | |
| 2002/0099347 A1 | 7/2002 | Chen et al. | |
| 2002/0110655 A1 | 8/2002 | Seth | |
| 2002/0132545 A1 | 9/2002 | Lenz | |
| 2003/0003832 A1 | 1/2003 | Childs et al. | |
| 2003/0118776 A1 | 6/2003 | Anderson et al. | |
| 2003/0131919 A1 | 7/2003 | King et al. | |
| 2003/0194932 A1 | 10/2003 | Clark et al. | |
| 2003/0207636 A1 | 11/2003 | Gosavi et al. | |
| 2004/0121121 A1 | 6/2004 | Anderson et al. | |
| 2004/0121689 A1 | 6/2004 | Anderson et al. | |
| 2004/0234744 A1* | 11/2004 | Byma et al. | 428/304.4 |

FOREIGN PATENT DOCUMENTS

| | | |
|---|---|---|
| EP | 0097036 A2 | 12/1983 |
| EP | 0171806 A2 | 2/1986 |
| EP | 0624676 B1 | 11/1994 |
| EP | 0669994 B1 | 9/1995 |
| EP | 0685586 A2 | 12/1995 |
| EP | 0685586 A3 | 12/1995 |
| EP | 0719355 B1 | 7/1996 |
| EP | 0765959 B1 | 4/1997 |
| EP | 0796940 A1 | 9/1997 |
| EP | 0872206 A1 | 10/1998 |
| EP | 0949371 A2 | 10/1999 |
| EP | 0963745 A1 | 12/1999 |
| EP | 0992338 A2 | 4/2000 |
| EP | 1050612 A1 | 11/2000 |
| GB | 935124 | 8/1963 |
| WO | WO 9612615 A1 | 5/1996 |
| WO | WO 9719808 A1 | 6/1997 |
| WO | WO 9809010 A1 | 3/1998 |
| WO | WO 9920821 A1 | 4/1999 |
| WO | WO 9920822 A1 | 4/1999 |
| WO | WO 9922059 A1 | 6/1999 |
| WO | WO 0082451 A1 | 2/2000 |
| WO | WO 0141622 A2 | 6/2001 |
| WO | WO 0141622 A3 | 6/2001 |
| WO | WO 0188247 A1 | 11/2001 |
| WO | WO 0234511 A1 | 5/2002 |
| WO | WO 0238846 A2 | 5/2002 |
| WO | WO 0238846 A3 | 5/2002 |
| WO | WO 02064360 A1 | 8/2002 |
| WO | WO 02064871 A2 | 8/2002 |
| WO | WO 02064871 A3 | 8/2002 |
| WO | WO 02076723 A1 | 10/2002 |

OTHER PUBLICATIONS

Abstract of Japanese Patent No. 11323715, Nov. 26, 19999.
Abstract of Japanese Patent No. 2182962, Jul. 17, 1990.
Abstract of Japanese Patent No. 4034058, Feb. 5, 1992.
Abstract of Japanese Patent No. 4057950, Feb. 25, 1992.
Abstract of Japanese Patent No. 4257359, Sep. 11, 1992.
Abstract of Japanese Patent No. 4272219, Sep. 29, 1992.
Abstract of Japanese Patent No. 48033174, May 8, 1973.
Abstract of Japanese Patent No. 5179545, Jul. 20, 1993.
Abstract of Japanese Patent No. 5214653, Aug. 24, 1993.
Abstract of Japanese Patent No. 5214654, Aug. 24, 1993.
Abstract of Japanese Patent No. 5287660, Nov. 2, 1993.
Abstract of Japanese Patent No. 5321018, Dec. 7, 1993.
Abstract of Japanese Patent No. 6184823, Jul. 5, 1994.
Abstract of Japanese Patent No. 6207361, Jul. 26, 1994.
Abstract of Japanese Patent No. 62268861, Nov. 21, 1987.
Abstract of Japanese Patent No. 6264345, Sep. 20, 1994.
Abstract of Japanese Patent No. 6306754, Nov. 1, 1994.
Abstract of Japanese Patent No. 6313215, Nov. 8, 1994.
Abstract of Japanese Patent No. 6330447, Nov. 29, 1994.
Abstract of Japanese Patent No. 8260247, Oct. 8, 1996.
Abstract of Japanese Patent No. 8311717, Nov. 26, 1996.
Abstract of Japanese Patent No. 8311718, Nov. 26, 1996.
PCT Search Report for PCT/US02/35120 Feb. 26, 2003.
PCT Search Report for PCT/US03/28824, Jan. 22, 2004.
PCT Search Report for PCT/US03/29175, Feb. 26, 2004.
Product Information for Kimberly-Clark Professional WYPALL® X Wipers, 2 pages, Mar. 6, 2003.
Article —"*Basic Chemistry of the Polyamides*," Polyamide Resins (Reinhold Plastics Applications Series), Don E. Floyd, General Mills, Inc., pp. 31-64.
Abstract of Japanese Patent No. 1026706, Jan. 30, 1989.
Search Report and Written Opinion for PCT/US2004/018875, Nov. 2, 2004.
Search Report and Written Opinion for PCT/US2004/018873, Nov. 5, 2004.

* cited by examiner

ULTRASONICALLY LAMINATED MULTI-PLY FABRICS

BACKGROUND OF THE INVENTION

Domestic and industrial wipers are often used to quickly absorb both polar liquids (e.g., water and alcohols) and non-polar liquids (e.g., oil). The wipers must have a sufficient absorption capacity to hold the liquid within the wiper structure until it is desired to remove the liquid by pressure, e.g., wringing. In addition, the wipers must also possess good physical strength and abrasion resistance to withstand the tearing, stretching and abrading forces often applied during use. Moreover, the wipers should also be soft to the touch.

In the past, nonwoven fabrics, such as meltblown nonwoven webs, have been widely used as wipers. Meltblown nonwoven webs possess an interfiber capillary structure that is suitable for absorbing and retaining liquid. However, meltblown nonwoven webs sometimes lack the requisite physical properties for use as a heavy-duty wiper, e.g., tear strength and abrasion resistance. Consequently, meltblown nonwoven webs are typically laminated to a support layer, e.g., a nonwoven web, which may not be desirable for use on abrasive or rough surfaces. Spunbond webs contain thicker and stronger fibers than meltblown nonwoven webs and may provide good physical properties, such as tear strength and abrasion resistance. However, spunbond webs sometimes lack fine interfiber capillary structures that enhance the adsorption characteristics of the wiper. Furthermore, spunbond webs often contain bond points that may inhibit the flow or transfer of liquid within the nonwoven webs. In response to these and other problems, composite fabrics were also developed that contained a nonwoven web of substantially continuous fibers hydraulically entangled with pulp fibers. Although these fabrics possessed good levels of strength, they sometimes lacked good oil absorption characteristics.

As such, a need remains for a fabric that is strong, soft, and also exhibits good absorption properties for use in a wide variety of wiper applications.

SUMMARY OF THE INVENTION

In accordance with one embodiment of the present invention, a method for forming a multi-ply fabric is disclosed. The method comprises positioning at least one inner ply between a first outer ply and a second outer ply. The first outer ply and the second outer ply each comprise a composite material that includes thermoplastic fibers and absorbent staple fibers. The inner ply comprises a nonwoven layer that includes thermoplastic fibers. The plies are ultrasonically laminated together.

In accordance with another embodiment of the present invention, a method for forming a multi-ply fabric is disclosed. The method comprises positioning at least one inner ply between a first outer ply and a second outer ply. The first outer ply and the second outer ply each comprise a nonwoven composite material that includes a spunbond web formed from substantially continuous polyolefin fibers. The spunbond web is hydraulically entangled with pulp fibers, the pulp fibers constituting greater than about 50 wt. % of the nonwoven composite material. The inner ply comprises a nonwoven layer that includes thermoplastic fibers. The plies are ultrasonically laminated together.

In accordance with still another embodiment of the present invention, a multi-ply fabric is disclosed that comprises at least one inner ply positioned between a first outer ply and a second outer ply. The first outer ply and the second outer ply each comprise a nonwoven composite material that includes substantially continuous thermoplastic fibers hydraulically entangled with pulp fibers. The pulp fibers constitute greater than about 50 wt. % of the nonwoven composite material. The inner ply comprises a nonwoven layer that includes thermoplastic fibers. The plies are ultrasonically laminated together. In one embodiment, a first surface of the first outer ply comprises a preponderance of absorbent staple fibers and a second surface of the second outer ply also comprises a preponderance of absorbent staple fibers. The first surface and the second surface may form opposing outer surfaces of the multi-ply fabric. In addition, the multi-ply fabric may further comprise bonded regions having a plurality of contiguous voids.

Other features and aspects of the present invention are discussed in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

Figure 1:
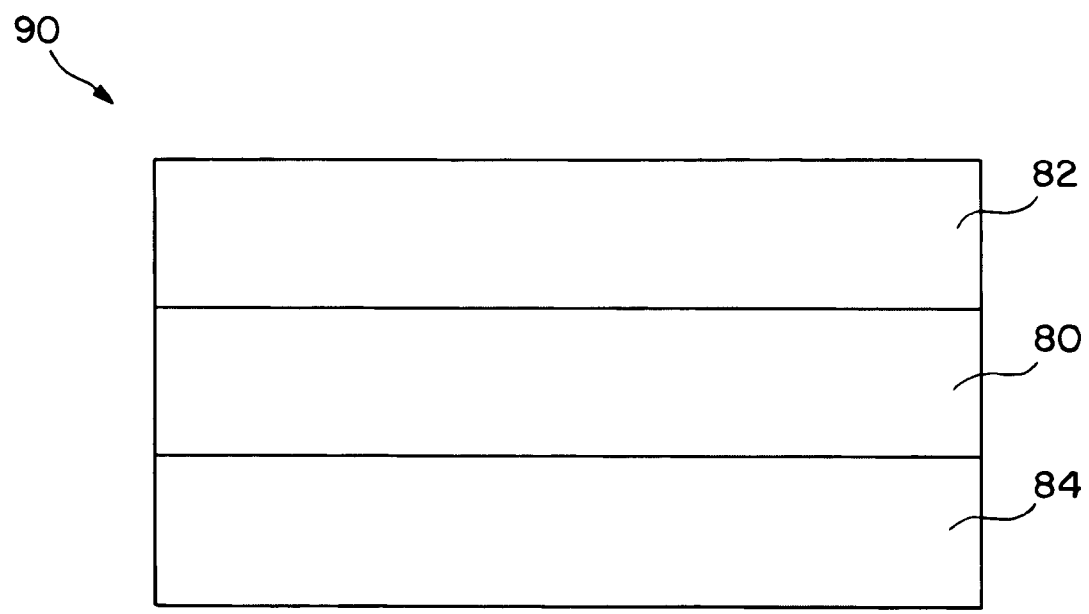
FIG. 1 is a schematic illustration of a three-ply fabric formed in accordance with one embodiment of the present invention.

Repeat use of reference characters in the present specification and drawings is intended to represent same or analogous features or elements of the invention.

DETAILED DESCRIPTION OF REPRESENTATIVE EMBODIMENTS

Reference now will be made in detail to various embodiments of the invention, one or more examples of which are set forth below. Each example is provided by way of explanation of the invention, not limitation of the invention. In fact, it will be apparent to those skilled in the art that various modifications and variations may be made in the present invention without departing from the scope or spirit of the invention. For instance, features illustrated or described as part of one embodiment, may be used on another embodiment to yield a still further embodiment. Thus, it is intended that the present invention covers such modifications and variations as come within the scope of the appended claims and their equivalents.

Definitions

As used herein, the term "nonwoven web" refers to a web having a structure of individual fibers or threads that are interlaid, but not in an identifiable manner as in a knitted fabric. Nonwoven webs include, for example, meltblown webs, spunbond webs, carded webs, airlaid webs, etc.

As used herein, the term "carded web" refers to a web that is made from staple fibers sent through a combing or carding unit, which separates or breaks apart and aligns the fibers to form a nonwoven web.

As used herein, the term "spunbond web" refers to a nonwoven web formed from small diameter substantially continuous fibers. The fibers are formed by extruding a molten thermoplastic material as filaments from a plurality of fine, usually circular, capillaries of a spinnerette with the diameter of the extruded fibers then being rapidly reduced as by, for example, eductive drawing and/or other well-known spunbonding mechanisms. The production of spunbond webs is described and illustrated, for example, in U.S. Pat. Nos. 4,340,563 to Appel, et al., 3,692,618 to Dorschner, et al., 3,802,817 to Matsuki, et al., 3,338,992 to Kinney, 3,341,394 to Kinney, 3,502,763 to Hartman, 3,502,538 to Levy, 3,542,615 to Dobo, et al., and 5,382,400 to Pike, et al., which are incorporated herein in their entirety by reference thereto for all purposes. Spunbond fibers are generally not tacky when they are deposited onto a collecting surface. Spunbond fibers may sometimes have diameters less than about 40 microns, and are often between about 5 to about 20 microns.

As used herein, the term "meltblown web" refers to a nonwoven web formed from fibers extruded through a plurality of fine, usually circular, die capillaries as molten fibers into converging high velocity gas (e.g. air) streams that attenuate the fibers of molten thermoplastic material to reduce their diameter, which may be to microfiber diameter. Thereafter, the meltblown fibers are carried by the high velocity gas stream and are deposited on a collecting surface to form a web of randomly disbursed meltblown fibers. Such a process is disclosed, for example, in U.S. Pat. No. 3,849,241 to Butin, et al., which is incorporated herein in its entirety by reference thereto for all purposes. In some instances, meltblown fibers may be microfibers that may be continuous or discontinuous, are generally smaller than 10 microns in diameter, and are generally tacky when deposited onto a collecting surface.

As used herein, the term "multicomponent fibers" or "conjugate fibers" refers to fibers that have been formed from at least two polymer components. Such fibers are usually extruded from separate extruders but spun together to form one fiber. The polymers of the respective components are usually different from each other although multicomponent fibers may include separate components of similar or identical polymeric materials. The individual components are typically arranged in substantially constantly positioned distinct zones across the cross-section of the fiber and extend substantially along the entire length of the fiber. The configuration of such fibers may be, for example, a side-by-side arrangement, a pie arrangement, or any other arrangement. Bicomponent fibers and methods of making the same are taught in U.S. Pat. Nos. 5,108,820 to Kaneko, et al., 4,795,668 to Kruege, et al., 5,382,400 to Pike, et al., 5,336,552 to Strack, et al., and 6,200,669 to Marmon, et al., which are incorporated herein in their entirety by reference thereto for all purposes. The fibers and individual components containing the same may also have various irregular shapes such as those described in U.S. Pat. Nos. 5,277,976 to Hogle, et al., 5,162,074 to Hills, 5,466,410 to Hills, 5,069,970 to Largman, et al., and 5,057,368 to Largman, et al., which are incorporated herein in their entirety by reference thereto for all purposes.

As used herein, the term "average fiber length" refers to a weighted average length of pulp fibers determined utilizing a Kajaani fiber analyzer model No. FS-100 available from Kajaani Oy Electronics, Kajaani, Finland. According to the test procedure, a pulp sample is treated with a macerating liquid to ensure that no fiber bundles or shives are present. Each pulp sample is disintegrated into hot water and diluted to an approximately 0.001% solution. Individual test samples are drawn in approximately 50 to 100 ml portions from the dilute solution when tested using the standard Kajaani fiber analysis test procedure. The weighted average fiber length may be expressed by the following equation:

$$\sum_{x_i}^{k} (x_i * n_i)/n$$

wherein,
k=maximum fiber length
$x_i$=fiber length
$n_i$=number of fibers having length $x_i$; and
n=total number of fibers measured.

As used herein, the term "low-average fiber length pulp" refers to pulp that contains a significant amount of short fibers and non-fiber particles. Many secondary wood fiber pulps may be considered low average fiber length pulps; however, the quality of the secondary wood fiber pulp will depend on the quality of the recycled fibers and the type and amount of previous processing. Low-average fiber length pulps may have an average fiber length of less than about 1.2 mm as determined by an optical fiber analyzer such as, for example, a Kajaani fiber analyzer model No. FS-100 (Kajaani Oy Electronics, Kajaani, Finland). For example, low average fiber length pulps may have an average fiber length ranging from about 0.7 to 1.2 mm. Exemplary low average fiber length pulps include virgin hardwood pulp, and secondary fiber pulp from sources such as, for example, office waste, newsprint, and paperboard scrap.

As used herein, the term "high-average fiber length pulp" refers to pulp that contains a relatively small amount of short fibers and non-fiber particles. High-average fiber length pulp is typically formed from certain non-secondary (i.e., virgin) fibers. Secondary fiber pulp that has been screened may also have a high-average fiber length. High-average fiber length pulps typically have an average fiber length of greater than about 1.5 mm as determined by an optical fiber analyzer such as, for example, a Kajaani fiber analyzer model No. FS-100 (Kajaani Oy Electronics, Kajaani, Finland). For example, a high-average fiber length pulp may have an average fiber length from about 1.5 mm to about 6 mm. Exemplary high-average fiber length pulps that are wood fiber pulps include, for example, bleached and unbleached virgin softwood fiber pulps.

DETAILED DESCRIPTION

In general, the present invention is directed to a multi-ply fabric that includes an inner ply positioned between two plies that each contain a nonwoven composite material. The present inventors have discovered that the material used to form the inner ply may be selectively controlled to optimize certain properties (e.g., strength, bulk, absorption capacity, absorption rate, handfeel, etc.) of the fabric for a particular application. For instance, in cases where enhanced oil absorption is desired, the inner ply may contain hydrophobic materials having a high affinity for oil, such as a spunbond web formed from substantially continuous polyolefin fibers. Likewise, the inner ply may contain hydrophilic materials, such as pulp fibers, which have a high affinity for water to provide enhanced water absorption. These properties are particularly improved when the plies are laminated together using ultrasonic bonding techniques. Specifically, without intending to be limited by theory, ultrasonic bonding of the plies is believed to result in the formation of pores and contiguous voids throughout the structure of the fabric, which further improve both oil and water absorption properties.

Referring to FIG. 1, for example, one embodiment of a multi-ply fabric 90 formed according to the present invention is illustrated. As shown, at least one inner ply 80 is positioned between two outer plies 82 and 84. It should be understood that any number of inner plies may be used, so long as the fabric includes at least one inner ply and at least two outer plies. For example, in one embodiment, the multi-ply fabric 90 may contain two additional inner plies (not shown) that sandwich the inner ply 80. These additional inner plies are likewise sandwiched by the two outer plies 82 and 84. The properties of one or more of these plies may be selectively controlled in accordance with the present invention.

Each outer ply 82 and 84 includes a nonwoven composite material containing absorbent staple fibers and thermoplastic fibers. The use of a nonwoven composite material is beneficial for a variety of reasons. For example, the thermoplastic fibers of the nonwoven composite material may improve strength, durability, and oil absorption properties of the fabric 90. Likewise, the absorbent staple fibers may improve bulk, handfeel, and water absorption properties of the fabric 90. The relative amounts of the thermoplastic fibers and absorbent staple fibers used in the nonwoven composite material may vary depending on the desired properties. For instance, the thermoplastic fibers may comprise less than about 50% by weight of the nonwoven composite material, and in some embodiments, from about 10% to about 40% by weight of the nonwoven composite material. Likewise, the absorbent staple fibers may comprise greater than about 50% by weight of the nonwoven composite material, and in some embodiments, from about 60% to about 90% by weight of the nonwoven composite material.

The absorbent staple fibers may be formed from a variety of different materials. For example, in one embodiment, the absorbent staple fibers are non-thermoplastic, and contain cellulosic fibers (e.g., pulp, thermomechanical pulp, synthetic cellulosic fibers, modified cellulosic fibers, and so forth), as well as other types of non-thermoplastic fibers (e.g., synthetic staple fibers). Some examples of suitable cellulosic fiber sources include virgin wood fibers, such as thermomechanical, bleached and unbleached softwood and hardwood pulps. Secondary or recycled fibers, such as obtained from office waste, newsprint, brown paper stock, paperboard scrap, etc., may also be used. Further, vegetable fibers, such as abaca, flax, milkweed, cotton, modified cotton, cotton linters, may also be used. In addition, synthetic cellulosic fibers such as, for example, rayon and viscose rayon may be used. Modified cellulosic fibers may also be used. For example, the absorbent staple fibers may be composed of derivatives of cellulose formed by substitution of appropriate radicals (e.g., carboxyl, alkyl, acetate, nitrate, etc.) for hydroxyl groups along the carbon chain. As stated, non-cellulosic fibers may also be utilized as absorbent staple fibers. Some examples of such absorbent staple fibers include, but are not limited to, acetate staple fibers, Nomex® staple fibers, Kevlar® staple fibers, polyvinyl alcohol staple fibers, lyocel staple fibers, and so forth.

When utilized as absorbent staple fibers, pulp fibers may have a high-average fiber length, a low-average fiber length, or mixtures of the same. Some examples of suitable high-average length pulp fibers include, but are not limited to, northern softwood, southern softwood, redwood, red cedar, hemlock, pine (e.g., southern pines), spruce (e.g., black spruce), combinations thereof, and so forth. Exemplary high-average fiber length wood pulps include those available from the Kimberly-Clark Corporation under the trade designation "Longlac 19". Some examples of suitable low-average fiber length pulp fibers may include, but are not limited to, certain virgin hardwood pulps and secondary (i.e. recycled) fiber pulp from sources such as, for example, newsprint, reclaimed paperboard, and office waste. Hardwood fibers, such as eucalyptus, maple, birch, aspen, and so forth, may also be used as low-average length pulp fibers. Mixtures of high-average fiber length and low-average fiber length pulps may be used. For example, a mixture may contain more than about 50% by weight low-average fiber length pulp and less than about 50% by weight high-average fiber length pulp. One exemplary mixture contains 75% by weight low-average fiber length pulp and about 25% by weight high-average fiber length pulp.

As stated, the nonwoven composite material also contains thermoplastic fibers. The thermoplastic fibers may be substantially continuous, or may be staple fibers having an average fiber length of from about 0.1 millimeters to about 25 millimeters, in some embodiments from about 0.5 millimeters to about 10 millimeters, and in some embodiments, from about 0.7 millimeters to about 6 millimeters. Regardless of fiber length, the thermoplastic fibers may be formed from a variety of different types of polymers including, but not limited to, polyolefins, polyamides, polyesters, polyurethanes, blends and copolymers thereof, and so forth. Desirably, the thermoplastic fibers contain polyolefins, and even more desirably, polypropylene and/or polyethylene. Suitable polymer compositions may also have thermoplastic elastomers blended therein, as well as contain pigments, antioxidants, flow promoters, stabilizers, fragrances, abrasive particles, fillers, and so forth. Optionally, multicomponent (e.g., bicomponent) thermoplastic fibers are utilized. For example, suitable configurations for the multicomponent fibers include side-by-side configurations and sheath-core configurations, and suitable sheath-core configurations include eccentric sheath-core and concentric sheath-core configurations. In some embodiments, as is well known in the art, the polymers used to form the multicomponent fibers have sufficiently different melting points to form different crystallization and/or solidification properties. The multicomponent fibers may have from about 20% to about 80%, and in some embodiments, from about 40% to about 60% by weight of the low melting polymer. Further, the multicomponent fibers may have from about 80% to about 20%, and in some embodiments, from about 60% to about 40%, by weight of the high melting polymer.

Besides thermoplastic fibers and absorbent staple fibers, the nonwoven composite material may also contain various other materials. For instance, small amounts of wet-strength resins and/or resin binders may be utilized to improve strength and abrasion resistance. Debonding agents may also be utilized to reduce the degree of hydrogen bonding. The addition of certain debonding agents in the amount of, for example, about 1% to about 4% percent by weight of a composite layer may also reduce the measured static and dynamic coefficients of friction and improve abrasion resistance. Various other materials such as, for example, activated charcoal, clays, starches, superabsorbent materials, etc., may also be utilized.

A variety of methods may be utilized to form the nonwoven composite material of the outer plies 82 and/or 84. In some embodiments, for instance, the nonwoven composite material is formed by integrally entangling thermoplastic fibers with absorbent staple fibers using any of a variety of entanglement techniques known in the art (e.g., hydraulic, air, mechanical, etc.). For example, in one embodiment, a nonwoven web formed from thermoplastic fibers is integrally entangled with absorbent staple fibers using hydraulic entanglement. A typical hydraulic entangling process utilizes high pressure jet streams of water to entangle fibers and/or filaments to form a highly entangled consolidated composite structure. Hydraulic entangled nonwoven composite materials are disclosed, for example, in U.S. Pat. Nos. 3,494,821 to Evans; 4,144,370 to Bouolton; 5,284,703 to Everhart, et al.; and 6,315,864 to Anderson, et al., which are incorporated herein in their entirety by reference thereto for all purposes.

Figure 2:
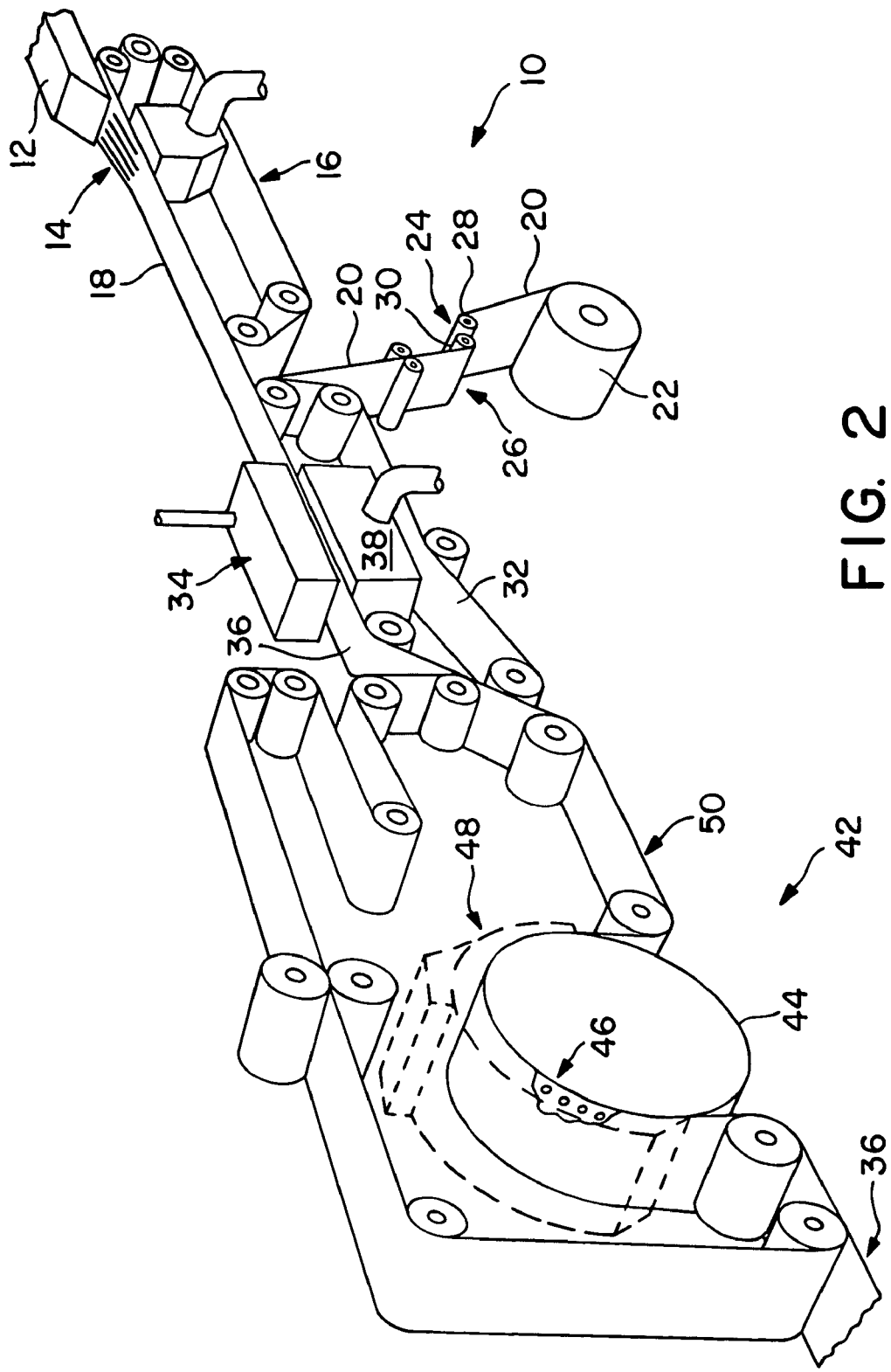
FIG. 2 is a schematic illustration of a process for forming a hydraulically entangled nonwoven composite material for use in one embodiment of the present invention.

Referring to FIG. 2, for instance, one embodiment of a hydraulic entangling process suitable for forming a nonwoven composite material from a nonwoven web and pulp fibers is illustrated. As shown, a fibrous slurry containing pulp fibers is conveyed to a conventional papermaking headbox 12 where it is deposited via a sluice 14 onto a conventional forming fabric or surface 16. The suspension of pulp fibers may have any consistency that is typically used in conventional papermaking processes. For example, the suspension may contain from about 0.01 to about 1.5 percent by weight pulp fibers suspended in water. Water is then removed from the suspension of pulp fibers to form a uniform layer 18 of the pulp fibers.

A nonwoven web 20 is also unwound from a rotating supply roll 22 and passes through a nip 24 of a S-roll arrangement 26 formed by the stack rollers 28 and 30. Any of a variety of techniques may be used to form the nonwoven web 20. For instance, in one embodiment, staple fibers are used to form the nonwoven web 20 using a conventional carding process, e.g., a woolen or cotton carding process. Other processes, however, such as air laid or wet laid processes, may also be used to form a staple fiber web. In addition, substantially continuous fibers may be used to form the nonwoven web 20, such as those formed by melt-spinning process, such as spunbonding, meltblowing, etc.

The nonwoven web 20 may be bonded to improve its durability, strength, hand, aesthetics and/or other properties. For instance, the nonwoven web 20 may be thermally, ultrasonically, adhesively and/or mechanically bonded. As an example, the nonwoven web 20 may be point bonded such that it possesses numerous small, discrete bond points. An exemplary point bonding process is thermal point bonding, which generally involves passing one or more layers between heated rolls, such as an engraved patterned roll and a second bonding roll. The engraved roll is patterned in some way so that the web is not bonded over its entire surface, and the second roll may be smooth or patterned. As a result, various patterns for engraved rolls have been developed for functional as well as aesthetic reasons. Exemplary bond patterns include, but are not limited to, those described in U.S. Pat. Nos. 3,855,046 to Hansen, et al., 5,620,779 to Levy, et al., 5,962,112 to Haynes, et al., 6,093,665 to Savovitz, et al., U.S. Design Pat. No. 428,267 to Romano, et al. and U.S. Design Pat. No. 390,708 to Brown, which are incorporated herein in their entirety by reference thereto for all purposes. For instance, in some embodiments, the nonwoven web 20 may be optionally bonded to have a total bond area of less than about 30% (as determined by conventional optical microscopic methods) and/or a uniform bond density greater than about 100 bonds per square inch. For example, the nonwoven web may have a total bond area from about 2% to about 30% and/or a bond density from about 250 to about 500 pin bonds per square inch. Such a combination of total bond area and/or bond density may, in some embodiments, be achieved by bonding the nonwoven web 20 with a pin bond pattern having more than about 100 pin bonds per square inch that provides a total bond surface area less than about 30% when fully contacting a smooth anvil roll. In some embodiments, the bond pattern may have a pin bond density from about 250 to about 350 pin bonds per square inch and/or a total bond surface area from about 10% to about 25% when contacting a smooth anvil roll.

Further, the nonwoven web 20 may be bonded by continuous seams or patterns. As additional examples, the nonwoven web 20 may be bonded along the periphery of the sheet or simply across the width or cross-direction (CD) of the web adjacent the edges. Other bond techniques, such as a combination of thermal bonding and latex impregnation, may also be used. Alternatively and/or additionally, a resin, latex or adhesive may be applied to the nonwoven web 20 by, for example, spraying or printing, and dried to provide the desired bonding. Still other suitable bonding techniques may be described in U.S. Pat. Nos. 5,284,703 to Everhart, et al., 6,103,061 to Anderson, et al., and 6,197,404 to Varona, which are incorporated herein in its entirety by reference thereto for all purposes.

Returning again to FIG. 2, the nonwoven web 20 is then placed upon a foraminous entangling surface 32 of a conventional hydraulic entangling machine where the pulp fiber layer 18 are then laid on the web 20. Although not required, it is typically desired that the pulp fiber layer 18 be positioned between the nonwoven web 20 and the hydraulic entangling manifolds 34. The pulp fiber layer 18 and the nonwoven web 20 pass under one or more hydraulic entangling manifolds 34 and are treated with jets of fluid to entangle the pulp fiber layer 18 with the fibers of the nonwoven web 20, and drive them into and through the nonwoven web 20 to form a nonwoven composite material 36. Alternatively, hydraulic entangling may take place while the pulp fiber layer 18 and the nonwoven web 20 are on the same foraminous screen (e.g., mesh fabric) that the wet-laying took place. The present invention also contemplates superposing a dried pulp fiber layer 18 on the nonwoven web 20, rehydrating the dried sheet to a specified consistency and then subjecting the rehydrated sheet to hydraulic entangling. The hydraulic entangling may take place while the pulp fiber layer 18 is highly saturated with water. For example, the pulp fiber layer 18 may contain up to about 90% by weight water just before hydraulic entangling. Alternatively, the pulp fiber layer 18 may be an air-laid or dry-laid layer.

Hydraulic entangling may be accomplished utilizing conventional hydraulic entangling equipment such as described in, for example, in U.S. Pat. Nos. 5,284,703 to Everhart, et al. and 3,485,706 to Evans, which are incorporated herein in their entirety by reference thereto for all purposes. Hydraulic entangling may be carried out with any appropriate working fluid such as, for example, water. The working fluid flows through a manifold that evenly distributes the fluid to a series of individual holes or orifices. These holes or orifices may be from about 0.003 to about 0.015 inch in diameter and may be arranged in one or more rows with any number of orifices, e.g., 30-100 per inch, in each row. For example, a manifold produced by Fleissner, Inc. of Charlotte, N.C., containing a strip having 0.007-inch diameter orifices, 30 holes per inch, and 1 row of holes may be utilized. However, it should also be understood that many other manifold configurations and combinations may be used. For example, a single manifold may be used or several manifolds may be arranged in succession. Moreover, although not required, the fluid pressure typically used during hydraulic entangling ranges from about 1000 to about 3000 psig, and in some embodiments, from about 1200 to about 1800 psig. For instance, when processed at the upper ranges of the described pressures, the nonwoven composite material 36 may be processed at speeds of up to about 1000 feet per minute (fpm).

Fluid may impact the pulp fiber layer 18 and the nonwoven web 20, which are supported by a foraminous surface, such as a single plane mesh having a mesh size of from about 40×40 to about 100×100. The foraminous surface may also be a multi-ply mesh having a mesh size from about 50×50 to about 200×200. As is typical in many water jet treatment processes, vacuum slots 38 may be located directly beneath the hydro-needling manifolds or beneath the foraminous entangling surface 32 downstream of the entangling manifold so that excess water is withdrawn from the hydraulically entangled nonwoven composite material 36.

Although not held to any particular theory of operation, it is believed that the columnar jets of working fluid that directly impact the pulp fiber layer 18 laying on the nonwoven web 20 work to drive the pulp fibers into and partially through the matrix or network of fibers in the nonwoven web 20. When the fluid jets and the pulp fiber layer 18 interact with the nonwoven web 20, the pulp fibers of the layer 18 are also entangled with the fibers of the nonwoven web 20 and with each other. In some embodiments, such entanglement may result in a material having a "sidedness" in that one surface has a preponderance of the thermoplastic fibers, giving it a slicker, more plastic-like feel, while another surface has a preponderance of pulp fibers, giving it a softer, more consistent feel. That is, although the pulp fibers of the layer 18 are driven through and into the matrix of the nonwoven web 20, many of the pulp fibers will still remain at or near a surface of the material 36. This surface may thus contain a greater proportion of pulp fibers, while the other surface may contain a greater proportion of the thermoplastic fibers of the nonwoven web 20.

After the fluid jet treatment, the resulting nonwoven composite material 36 may then be transferred to a drying operation (e.g., compressive, non-compressive, etc.). A differential speed pickup roll may be used to transfer the material from the hydraulic needling belt to the drying operation. Alternatively, conventional vacuum-type pickups and transfer fabrics may be used. If desired, the nonwoven composite material 36 may be wet-creped before being transferred to the drying operation. Non-compressive drying of the material 36, for instance, may be accomplished utilizing a conventional through-dryer 42. The through-dryer 42 may be an outer rotatable cylinder 44 with perforations 46 in combination with an outer hood 48 for receiving hot air blown through the perforations 46. A through-dryer belt 50 carries the nonwoven composite material 36 over the upper portion of the through-dryer outer cylinder 40. The heated air forced through the perforations 46 in the outer cylinder 44 of the through-dryer 42 removes water from the nonwoven composite material 36. The temperature of the air forced through the nonwoven composite material 36 by the through-dryer 42 may range from about 200° F. to about 500° F. Other useful through-drying methods and apparatuses may be found in, for example, U.S. Pat. Nos. 2,666,369 to Niks and 3,821,068 to Shaw, which are incorporated herein in their entirety by reference thereto for all purposes.

In addition to a hydraulically entangled nonwoven composite material, the nonwoven composite material may also contain a blend of thermoplastic fibers and absorbent staple fibers. For instance, the nonwoven composite material may be a "coform" material, which may be made by a process in which at least one meltblown die head is arranged near a chute through which absorbent staple fibers are added to the nonwoven web while it forms. Some examples of such coform materials are disclosed in U.S. Pat. Nos. 4,100,324 to Anderson, et al.; 5,284,703 to Everhart, et al.; and 5,350,624 to Georger, et al.; which are incorporated herein in their entirety by reference thereto for all purposes.

The basis weight of the nonwoven composite material used to form the outer plies 82 and 84 may be selected to optimize strength and performance, and minimize costs. For example, as will be described in more detail below, the use of one or more inner plies 80 may enhance the overall strength of the fabric 90, thereby lessening the reliance on the nonwoven composite material of the outer plies 82 and 84 for strength. Thus, the basis weight of the nonwoven composite material may be selected to lower costs without sacrificing strength. In some embodiments, for example, a relatively lightweight nonwoven composite material may be utilized that has a basis weight of from about 10 to about 80 grams per square meter (gsm), and in some embodiments, from about 40 to about 70 gsm. It should be understood, however, that nonwoven composite materials having a higher basis weight may also be utilized in the present invention. For example, a relatively heavyweight nonwoven composite material may be utilized that has a basis weight of from about 80 to about 250 gsm, and in some embodiments, from about 100 to about 150 gsm.

The outer plies 82 and 84 may also be imparted with a relatively high liquid permeability so that they effectively serve as wicking layers for transferring liquids to the inner ply 80, which then effectively acts as an absorbent core. For example, the nonwoven composite material of the outer plies 82 and 84 may possess pores that are relatively large in diameter. Due to the presence of such larger pores, the nonwoven composite materials receive fluids at a relatively fast rate. In some cases, when containing hydrophobic fibers (e.g., polyolefin fibers), a hydrophilic fluid (e.g., water) tends to flow quickly through the nonwoven composite material and into the inner ply 80. Once present within the inner ply 80, the hydrophilic fluid may be readily absorbed.

Referring again to FIG. 1, in addition to the outer plies 82 and/or 84, the fabric 90 also contains at least one inner ply 80. In accordance with the present invention, the inner ply 80 includes a nonwoven layer containing thermoplastic fibers. The present inventors have discovered that, when laminated between two outer plies, the characteristics of the nonwoven layer may be manipulated to achieve enhanced properties of the fabric 90. For instance, a relatively high content of thermoplastic fibers may be selected to improve the oil absorption properties of the fabric 90. Specifically, the hydrophobic nature of such thermoplastic fibers results in a high affinity for oil-based compounds, and may thus improve the oil absorption characteristics of the fabric 90. As such, when oil absorption is a primary concern, the nonwoven layer may contain greater than about 50 wt. %, in some embodiments greater than about 75 wt. %, and in some embodiments, greater than about 90 wt. % thermoplastic fibers. For instance, in one embodiment, the nonwoven layer is a web formed from approximately 100 wt. % meltblown or spunbond thermoplastic fibers (e.g., polypropylene, polyethylene, etc.).

Likewise, the nonwoven layer may also have a relatively high content of absorbent staple fibers (e.g., pulp fibers) to improve the water absorption characteristics of the fabric 90. Specifically, the nonwoven layer may contain greater than about 50 wt. %, and in some embodiments, from about 60 wt. % to about 90 wt. % absorbent staple fibers. These types of fibers may also have other benefits, such as improving the bulk, resiliency, and handfeel of the resulting fabric. When containing absorbent staple fibers, the nonwoven layer also includes at least some thermoplastic fibers to facilitate ultrasonic bonding to the materials of the outer plies 82 and 84. In most embodiments, for instance, the nonwoven layer includes at least about 5 wt. % of thermoplastic fibers. Such nonwoven composite materials used in the inner ply 80 may be the same or different than the above-described nonwoven composite materials used in the outer plies 82 and 84. In one embodiment, for instance the nonwoven layer of the inner ply 80 is a hydraulically entangled composite of a spunbond polyolefin web and pulp fibers. In another embodiment, the nonwoven layer of the inner ply 80 is a bonded, carded web containing a blend of polyolefin staple fibers and pulp fibers.

Apart from improving absorption characteristics, the inner ply 80 may also be selected to improve the strength, bulk, and/or handfeel of the fabric 90. For instance, nonwoven layers containing a higher percentage of thermoplastic fibers may better improve strength, while those containing a higher percentage of absorbent staple fibers may better improve bulk and handfeel. In addition, the basis weight of the nonwoven layer used in the inner ply 80 may also affect certain properties, such as strength. In most embodiments of the present invention, the nonwoven layer of the inner ply 80 has a basis weight of from about 10 to about 200 grams per square meter (gsm), and in some embodiments from about 20 to about 140 gsm, and in some embodiments from about 60 to about 125 gsm.

Regardless of the particular materials selected, the plies 80, 82, and 84 are bonded together according to the present invention using ultrasonic techniques. For instance, ultrasonic bonding through the use of a stationary horn and a rotating patterned anvil roll is described in U.S. Pat. Nos. 3,939,033 to Grgach, et al., 3,844,869 to Rust Jr., and 4,259,399 to Hill, which are incorporated herein in their entirety by reference thereto for all purposes. Moreover, ultrasonic bonding through the use of a rotary horn with a rotating patterned anvil roll is described in U.S. Pat. Nos. 5,096,532 to Neuwirth, et al., 5,110,403 to Ehlert, and 5,817,199 to Brennecke, et al., which are incorporated herein in their entirety by reference thereto for all purposes. Of course, any other ultrasonic bonding technique may also be used in the present invention.

Figure 3:
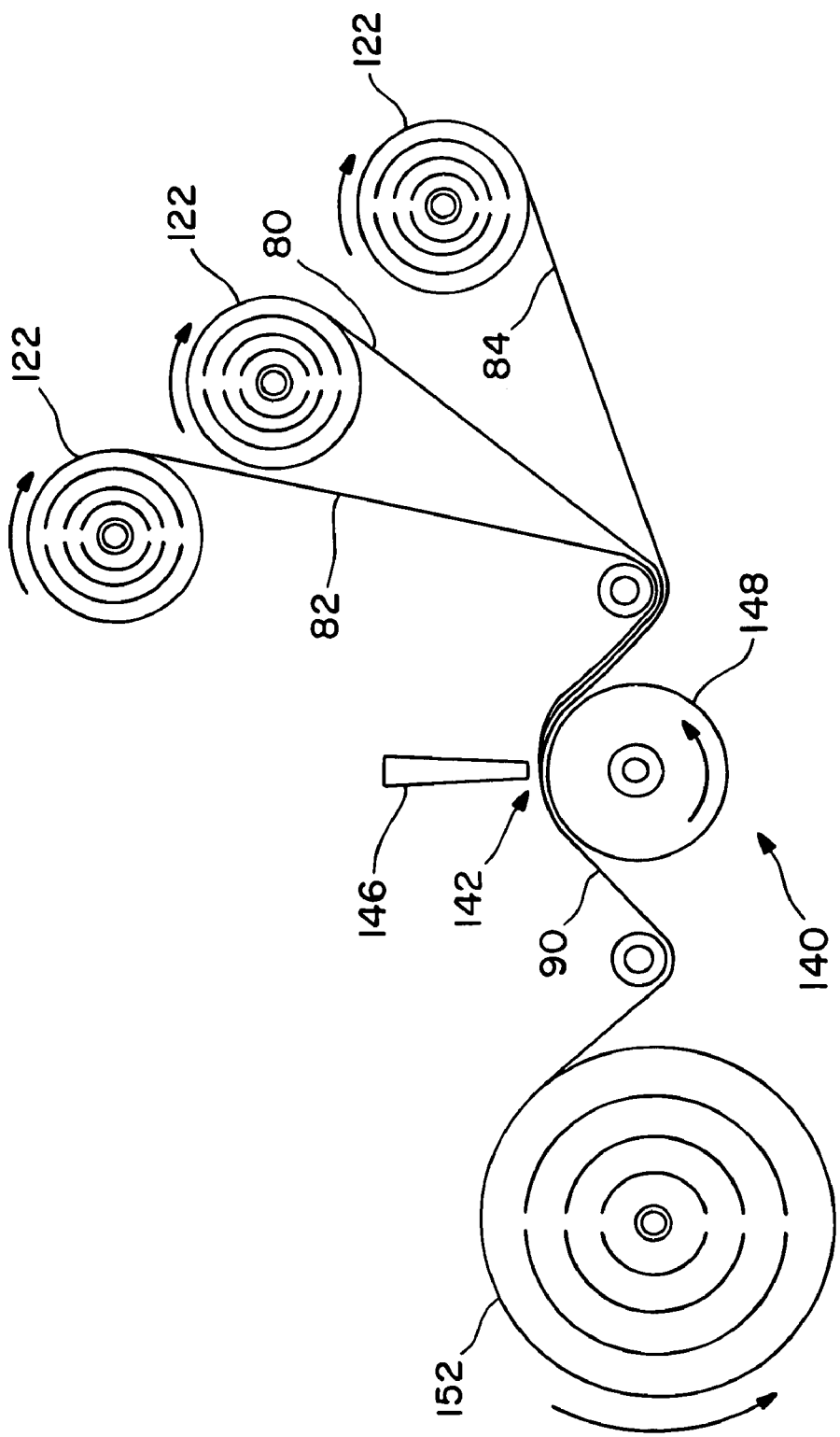
FIG. 3 is a schematic illustration of a process for ultrasonically laminating a three-ply fabric in accordance with one embodiment of the present invention.

Referring to FIG. 3, for example, one embodiment of a suitable ultrasonic bonding technique is illustrated. As shown, the plies 80, 82, and 84 are initially unwound from first, second, and third base rolls 122, and then fed into a nip 142 of an ultrasonic laminator 140. The nip 142 of the ultrasonic laminator 140 is formed between a stationary ultrasonic horn 146 and a rotating patterned anvil roll 148. Generally speaking, the anvil roll 148 may possess any desired pattern that provides sufficient points or areas to allow the thermoplastic material to melt, flow, bond and solidify. One example of a suitable ultrasonic laminator, for instance, is the Branson Ultrasonic Unit, model number 2000BDC, which is commercially available from Branson Ultrasonic Corporation of Danbury, Conn. and has 6-inch stationary horns.

Patterns may be chosen that provide desirable visual appearance, for non-limiting example, a cloth-like appearance. Exemplary patterns include, but are not limited to, those taught in U.S. Pat. Nos. D369,907 to Savovitz, et al., D428,267 to Romano III, et al., and D428,710 to Romano III, et al., which are incorporated herein in their entirety by reference thereto for all purposes. Once bonded within the nip 142, the resulting fabric 90 is wound into a final base roll 152. Alternatively, the fabric 90 may be transferred to subsequent finishing and/or post treatment processes to impart selected properties to the fabric 90. For example, the fabric 90 may be lightly pressed by calender rolls, creped, embossed, debulked, rewound, or brushed to provide a uniform exterior appearance and/or certain tactile properties. Alternatively and/or additionally, chemical post-treatments such as, adhesives or dyes may be added to the fabric 90. It should also be understood that the plies 80, 82, and 84 may be independently subjected to such finishing and/or post-treatment processes prior to lamination.

During ultrasonic lamination, a patterned, rough surface texture is imparted to the side of the fabric 90 that contacts, for instance, the patterned anvil roll 148. This surface texture may aid in the scrubbing, removal and entrapment of debris from a surface being cleaned. The rough surface texture also provides a larger surface area with a repetitive textured geometry that aids in the removal and entrapment of high viscosity liquids onto the surface of the fabric 90, and facilitates wicking into the surface of the fabric 90. From the surface of the fabric 90, liquids may then be absorbed in the −z direction into the center core of the fabric 90. Fabrics that have not been laminated or embossed may exhibit a relatively smooth texture on both sides of the material that does not provide this attribute.

Ultrasonic lamination also results in the formation of bonded regions within the fabric 90. These bonded regions form between the thermoplastic fibers of the outer plies 82 and 84 and the thermoplastic fibers of the inner ply 80, and also to some extent, between the thermoplastic fibers of the outer plies 82 and 84. Although the present inventors do not wish to be held to a particular theory of operation, it is believed that the absorbent staple fibers inhibit full melting of the thermoplastic fibers, thus preventing the formation of a substantially polymer-filled bonded region that would otherwise occur during bonding of a web containing only thermoplastic fibers. That is, while there is bonding between individual thermoplastic fibers, there is no substantially polymer-filled bonded region formed in the bonded area. This lack of total melting creates pores at the surface and voids throughout the −z direction, i.e., perpendicular to the surface of the fabric. These pores and voids allow liquids to enter the fabric 90 at the surface of the bonded region and to travel laterally through the bonded region to the high capacity areas of the fabric 90 between the bonded regions.

The bonded regions between the plies 80, 82, and 84 desirably provide sufficient strength to reduce the probability of delamination during use. A peel strength test is used to determine the bond strength between component layers of bonded or laminated fabrics. Desirably, the peel strength ranges from about 25 grams to about 500 grams. More desirably, the peel strength ranges from about 50 grams to about 300 grams, and even more desirably the peel strength ranges from about 50 grams to about 200 grams. Without intending to be limited by theory, it is believed that the presence of the inner ply 80 causes a more uniform distribution of the bond energy during ultrasonic lamination, which further enhances peel strength. The ability to achieve the desired peel strengths without the formation of substantially polymer-filled bond regions also provides an improved feel to the fabric 90 that manifests itself in increased drapability and/or softness. Again, without intending to be limited by theory, it is believed that this is due to the lack of polymer-filled bonded regions and to the increased freedom that the absorbent staple fibers have to move within the bonded regions. Because there is no polymer-filled bonded region, the absorbent staple fibers are not substantially occluded within the bonded regions. This results in improved drapability, softness, and/or handfeel.

Thus, the fabric 90 is produced utilizing an ultrasonic bonding process that provides sufficient ply strength, yet yields an open structure within the bonded regions. The structure is open in all three dimensions. It allows flow not only from the outside of the bonded region to the inside of the bonded region, i.e., the −z direction, but also allows flow laterally in the −x and −y directions. The process also provides a softness, hand and/or drape that otherwise is not found in thermally bonded materials. Desirably, these properties are achieved through selection and use of high ultrasonic power output, high line speed, and low nip pressure. For example, in some embodiments, line speeds of from about 100 to about 3500 feet per minute, in some embodiments from about 300 to about 2500 feet per minute, and in some embodiments from about 900 to about 1500 feet per minute, may be used. High ultrasonic power output allows the energy to penetrate the plies and fuse the thermoplastic fibers in the middle region of the fabric 90. High line speed reduces dwell time and reduces the potential for excessive bonding that may result in burning and/or hole formation. Low nip pressure reduces the compression of the fibers within the bond points and avoids the complete loss of voids as well.

Ultrasonic lamination may also result in a distinctive sidedness to the fabric 90. For instance, as described above, one surface of each ply 82 and 84 may possess a preponderance of the thermoplastic fibers, giving it a slicker, more plastic-like feel, while the opposite surface has a preponderance of absorbent staple fibers, giving it a softer, more consistent feel. When laminating these plies 82 and 84 together with one or more inner plies 80, it is desired that the surfaces having the preponderance of the thermoplastic fibers face the inside of the laminated structure, leaving the surfaces having the preponderance of the absorbent staple fibers on the outside. Juxtaposing the plies 82 and 84 in this manner results in increased opacity and improved visual aesthetics and hand feel in comparison to single ply structures. Positioning the surfaces having the preponderance of thermoplastic fibers within the interior of the laminate also allows use of non-pigmented thermoplastic fibers because the thermoplastic fibers are less visible after the plies are laminated together. Colored wipers may then be produced, for example, by dying only the absorbent staple fibers, resulting in reduced manufacturing costs.

The multi-ply fabric of the present invention is particularly useful as a wiper. The wiper may have a basis weight of from about 20 grams per square meter ("gsm") to about 300 gsm, in some embodiments from about 30 gsm to about 200 gsm, and in some embodiments, from about 50 gsm to about 150 gsm. Lower basis weight products are typically well suited for use as light duty wipers, while higher basis weight products are well suited as industrial wipers. The wipers may also have any size for a variety of wiping tasks. The wiper may also have a width from about 8 centimeters to about 100 centimeters, in some embodiments from about 10 to about 50 centimeters, and in some embodiments, from about 20 centimeters to about 25 centimeters. In addition, the wiper may have a length from about 10 centimeters to about 200 centimeters, in some embodiments from about 20 centimeters to about 100 centimeters, and in some embodiments, from about 35 centimeters to about 45 centimeters.

If desired, the wiper may also be pre-moistened with a liquid, such as water, a waterless hand cleanser, or any other suitable liquid. The liquid may contain antiseptics, fire retardants, surfactants, emollients, humectants, and so forth. In one embodiment, for example, the wiper may be applied with a sanitizing formulation, such as described in U.S. Patent Application Publication No. 2003/0194932 to Clark, et al., which is incorporated herein in its entirety by reference thereto for all purposes. The liquid may be applied by any suitable method known in the art, such as spraying, dipping, saturating, impregnating, brush coating and so forth. The amount of the liquid added to the wiper may vary depending upon the nature of the composite fabric, the type of container used to store the wipers, the nature of the liquid, and the desired end use of the wipers. Generally, each wiper contains from about 150 to about 600 wt. %, and in some embodiments, from about 300 to about 500 wt. % of the liquid based on the dry weight of the wiper.

In one embodiment, the wipers are provided in a continuous, perforated roll. Perforations provide a line of weakness by which the wipers may be more easily separated. For instance, in one embodiment, a 6" high roll contains 12" wide wipers that are v-folded. The roll is perforated every 12 inches to form 12"×12" wipers. In another embodiment, the wipers are provided as a stack of individual wipers. The wipers may be packaged in a variety of forms, materials and/or containers, including, but not limited to, rolls, boxes, tubs, flexible packaging materials, and so forth. For example, in one embodiment, the wipers are inserted on end in a selectively resealable container (e.g., cylindrical). Some examples of suitable containers include rigid tubs, film pouches, etc. One particular example of a suitable container for holding the wipers is a rigid, cylindrical tub (e.g., made from polyethylene) that is fitted with a re-sealable air-tight lid (e.g., made from polypropylene) on the top portion of the container. The lid has a hinged cap initially covering an opening positioned beneath the cap. The opening allows for the passage of wipers from the interior of the sealed container whereby individual wipers may be removed by grasping the wiper and tearing the seam off each roll. The opening in the lid is appropriately sized to provide sufficient pressure to remove any excess liquid from each wiper as it is removed from the container.

Other suitable wiper dispensers, containers, and systems for delivering wipers are described in U.S. Pat. Nos. 5,785,179 to Buczwinski, et al.; 5,964,351 to Zander; 6,030,331 to Zander; 6,158,614 to Haynes, et al.; 6,269,969 to Huang, et al.; 6,269,970 to Huang, et al.; and 6,273,359 to Newman, et al., which are incorporated herein in their entirety by reference thereto for all purposes.

The present invention may be better understood with reference to the following example.

Test Methods

The following test methods are utilized in the Example.

Caliper: The caliper of a fabric corresponds to its thickness. The caliper was measured in the example in accordance with TAPPI test methods T402 "Standard Conditioning and Testing Atmosphere For Paper, Board, Pulp Handsheets and Related Products" or T411 om-89 "Thickness (caliper) of Paper, Paperboard, and Combined Board" with Note 3 for stacked sheets. The micrometer used for carrying out T411 om-89 may be an Emveco Model 200A Electronic Microgage (made by Emveco, Inc. of Newberry, Oreg.) having an anvil diameter of 57.2 millimeters and an anvil pressure of 2 kilopascals.

Grab Tensile Strength: The grab tensile test is a measure of breaking strength of a fabric when subjected to unidirectional stress. This test is known in the art and conforms to the specifications of Method 5100 of the Federal Test Methods Standard 191A. The results are expressed in pounds to break. Higher numbers indicate a stronger fabric. The grab tensile test uses two clamps, each having two jaws with each jaw having a facing in contact with the sample. The clamps hold the material in the same plane, usually vertically, separated by 3 inches (76 mm) and move apart at a specified rate of extension. Values for grab tensile strength are obtained using a sample size of 4 inches (102 mm) by 6 inches (152 mm), with a jaw facing size of 1 inch (25 mm) by 1 inch, and a constant rate of extension of 300 mm/min. The sample is wider than the clamp jaws to give results representative of effective strength of fibers in the clamped width combined with additional strength contributed by adjacent fibers in the fabric. The specimen is clamped in, for example, a Sintech 2 tester, available from the Sintech Corporation of Cary, N.C., an Instron Model™, available from the Instron Corporation of Canton, Mass., or a Thwing-Albert Model INTELLECT II available from the Thwing-Albert Instrument Co. of Philadelphia, Pa. This closely simulates fabric stress conditions in actual use. Results are reported as an average of three specimens and may be performed with the specimen in the cross direction (CD) or the machine direction (MD).

Water Intake Rate: The intake rate of water is the time required, in seconds, for a sample to completely absorb the liquid into the web versus sitting on the material surface. Specifically, the intake of water is determined according to ASTM No. 2410 by delivering 0.5 cubic centimeters of water with a pipette to the material surface. Four (4) 0.5-cubic centimeter drops of water (2 drops per side) are applied to each material surface. The average time for the four drops of water to wick into the material (z-direction) is recorded. Lower absorption times, as measured in seconds, are indicative of a faster intake rate. The test is run at conditions of 73.4°±3.6° F. and 50%±5% relative humidity.

Oil Intake Rate: The intake rate of oil is the time required, in seconds, for a sample to absorb a specified amount of oil. The intake of 50 W motor oil is determined in the same manner described above for water, except that 0.1 cubic centimeters of oil is used for each of the four (4) drops (2 drops per side).

Absorption Capacity: The absorption capacity refers to the capacity of a material to absorb a liquid (e.g., water or motor oil) over a period of time and is related to the total amount of liquid held by the material at its point of saturation. The absorption capacity is measured in accordance with Federal Specification No. UU-T-595C on industrial and institutional towels and wiping papers. Specifically, absorption capacity is determined by measuring the increase in the weight of the sample resulting from the absorption of a liquid and is expressed as either the weight of liquid absorbed or the % liquid absorbed, using the following equations:

Absorption Capacity=(saturated sample weight−sample weight).

or

% Absorption Capacity=[(saturated sample weight−sample weight)/sample weight]×100.

Taber Abrasion Resistance: Taber Abrasion resistance measures the abrasion resistance in terms of destruction of the fabric produced by a controlled, rotary rubbing action. Abrasion resistance is measured in accordance with Method 5306, Federal Test Methods Standard No. 191A, except as otherwise noted herein. Only a single wheel is used to abrade the specimen. A 12.7×12.7-cm specimen is clamped to the specimen platform of a Taber Standard Abrader (Model No. 504 with Model No. E-140-15 specimen holder) having a rubber wheel (No. H-18) on the abrading head and a 500-gram counterweight on each arm. The loss in breaking strength is not used as the criteria for determining abrasion resistance. The results are obtained and reported in abrasion cycles to failure where failure was deemed to occur at that point where a 0.5-cm hole is produced within the fabric.

Drape Stiffness: The "drape stiffness" test measures the resistance to bending of a material. The bending length is a measure of the interaction between the material weight and stiffness as shown by the way in which the material bends under its own weight, in other words, by employing the principle of cantilever bending of the composite under its own weight. In general, the sample was slid at 4.75 inches per minute (12 cm/min), in a direction parallel to its long dimension, so that its leading edge projected from the edge of a horizontal surface. The length of the overhang was measured when the tip of the sample was depressed under its own weight to the point where the line joining the tip to the edge of the platform made a 41.50° angle with the horizontal. The longer the overhang, the slower the sample was to bend; thus, higher numbers indicate stiffer composites. This method conforms to specifications of ASTM Standard Test D 1388. The drape stiffness, measured in inches, is one-half of the length of the overhang of the specimen when it reaches the 41.50° slope. The test samples were prepared as follows. Samples were cut into rectangular strips measuring 1 inch (2.54 cm) wide and 6 inches (15.24 cm) long. Specimens of each sample were tested in the machine direction and cross direction. A suitable Drape-Flex Stiffness Tester, such as FRL-Cantilever Bending Tester, Model 79-10 available from Testing Machines Inc., located in Amityville, N.Y., was used to perform the test.

Peel Strength: This test determines the bond strength between plies of laminated fabrics. In peel or delamination testing, the laminate is tested for the amount of tensile force required to pull a ply apart from another ply. Values for the peel strength are obtained using a width of fabric sample in approximately 6×4 inch specimens (6 inches in the MD direction). The plies of the specimens are manually separated for a distance of about 2 inches along the length of the specimen. One ply is then clamped into each jaw of a tensile testing machine, and subjected to a constant rate of extension. Two clamps are used, each with two equal sized jaws measuring 1 inch parallel to the direction of load application and 4 inches perpendicular to the application of load. The sample is clamped, for example, using an Instron Model™ 1000, 1122, or 1130 (available from the Instron Corporation of Canton, Mass.); a Sintech Tensile Tester, Sintech QAD or Sintech Testworks (available from Sintech, Inc. of Research Triangle Park, N.C.); or a Thwing-Albert, Model INTELLECT II (available from Thwing-Albert Instrument Company of Philadelphia, Pa.). The sample is then pulled apart for a distance of 2 inches at 180 degrees of separation and the average peel strength recorded in grams. A constant rate of extension is applied of 12±0.4 in/min (300±10 mm/min). The peel strength is the average force, expressed in grams, that is required to separate the bonded fabric at 180 degrees angle over a distance of two inches.

EXAMPLE

The ability to form multi-ply fabrics in accordance with the present invention was demonstrated. Multiple 3-ply samples were formed that contained an inner ply sandwiched between two composite outer plies. Each composite outer ply was made in accordance with U.S. Pat. No. 5,284,703 to Everhart, et al. Specifically, the composite plies were formed from a point bonded spunbond web having a basis weight of 11.3 grams per square meter. The spunbond web contained 100% polypropylene fibers having a denier per filament of approximately 3.0. The spunbond web was hydraulically entangled with a pulp fiber component on a coarse wire using three jet strips at an entangling pressure of 1100 pounds per square inch. The pulp fiber component contained LL-19 northern softwood kraft fibers (available from Kimberly-Clark Corporation) and 1 wt. % of Arosurf® PA801 (a debonder available from Goldschmidt). The pulp fiber component also contained 2 wt. % of PEG (polyethylene glycol) 600. After hydraulic entanglement, the composite material was dried, print bonded to a dryer using an ethylene/vinyl acetate copolymer latex adhesive available from Air Products, Inc. under the name "Airflex A-105" (viscosity of 95 cps and 28% solids), and then creped using a degree of creping of 30%. The resulting composite material contained 30 wt. % of the spunbond web and 70 wt. % of the pulp fiber component, and had a basis weight of 64 grams per square meter.

The inner ply varied for the 3-ply samples. Specifically, the inner ply of some of the 3-ply samples was a bonded carded nonwoven web containing 100 wt. % polypropylene fibers and having a basis weight of 45 gsm. The inner ply of other 3-ply samples was a point bonded, spunbond web formed from 100 wt. % polypropylene fibers and having a basis weight of 30 gsm. Finally, the inner ply of still other 3-ply samples was a point bonded, spunbond web formed from 100 wt. % polypropylene fibers and having a basis weight of 22.6 gsm.

To form the multi-ply samples, the plies were directed through an ultrasonic laminator obtained from Herrmann Ultrasonics of Schaumburg, Ill. under the name "Non-Contact/Non-Wear Ultrasonic Welding System." The ultrasonic laminator utilized two (2) stationary horns each having a width of 6 inches, a patterned anvil roll, 4000-watt power generators, and a gap sensor system. The gap sensor system monitored and progressively changed the gap setting between the ultrasonic horns and the anvil roll to maintained the desired force. Various conditions (i.e., line speeds, lamination forces, and anvil roll bonding patterns) were utilized to form the 3-ply samples, and are set forth below in Table 1.

TABLE 1

Conditions for Forming the 3-Ply Samples

| Sample | Inner Ply | Line Speed (meter per minute) | Avg. Force (Newtons) | Anvil Roll Pattern[1] |
|---|---|---|---|---|
| 1 | Bonded Carded | 100 | 1250 | C |
| 2 | Bonded Carded | 100 | 1350 | C |
| 3 | Spunbond | 50 | 1200 | A |
| 4 | Spunbond | 50 | 1400 | A |
| 5 | Spunbond | 50 | 1800 | A |
| 6 | Spunbond | 50 | 2000 | A |
| 7 | Spunbond | 100 | 2000 | A |
| 8 | Spunbond | 150 | 2000 | A |
| 9 | Spunbond | 100 | 1300 | B |

[1]Pattern A is a striped pattern having a total bond area of 4.7%. Pattern B is a striped pattern having a total bond area of 10.7%. Pattern C is a dot pattern having a total bond area of 5.9%.

2-ply samples were also formed from nonwoven composite materials for comparison to the 3-ply samples. The 2-ply samples were formed from various wipers commercially available from Kimberly-Clark Corp. The plies designated "Primere™" had a basis weight of approximately 64 grams per square meter (gsm) and were formed from a polypropylene spunbond web (11.3 gsm) hydraulically entangled with northern softwood kraft fibers. The plies designated "Wypall® X70 Blue" had a basis weight of approximately 82 gsm and were formed from a polypropylene spunbond bond web (22.7 gsm) hydraulically entangled with northern softwood kraft fibers. Finally, the plies designated "Wypall® X60 White" had a basis weight of approximately 64 gsm and were formed from a polypropylene spunbond bond web (11.3 gsm) hydraulically entangled with northern softwood kraft fibers.

The 2-ply samples were laminated using the same ultrasonic laminator as described above for the 3-ply samples. The conditions for the formation of the 2-ply samples are set forth below in Table 2.

TABLE 2

Conditions for 2-Ply Samples

| Samples | Plies | Line Speed (meter per minute) | Avg. Force (Newtons) | Anvil Roll Pattern[1] |
|---|---|---|---|---|
| 10-19 | Primere ™ | 100 | 885 to 1770 | B |
| 20-27 | Primere ™ | 300 | 1309 to 1970 | B |
| 28-31 | Primere ™ | 100 | 600 to 900 | C |
| 32-40 | Primere ™ | 300 | 800 to 1600 | C |
| 41-46 | Primere ™ | 100 | 800 to 1300 | A |
| 47-51 | Primere ™ | 300 | 800 to 1500 | A |
| 52-60 | Wypall ® X70 Blue | 100 | 1185 to 2485 | B |
| 61-67 | Wypall ® X70 Blue | 300 | 1585 to 2335 | B |
| 68-70 | Wypall ® X70 Blue | 100 | 900 to 1100 | C |
| 71-81 | Wypall ® X70 Blue | 300 | 1100 to 2100 | C |
| 82-88 | Wypall ® X70 Blue | 100 | 800 to 1400 | A |
| 89-92 | Wypall ® X70 Blue | 300 | 1300 to 1800 | A |
| 93-104 | Wypall ® X60 White | 100 | 985 to 1785 | B |
| 105-109 | Wypall ® X60 White | 100 | 600 to 1000 | C |
| 110-118 | Wypall ® X60 White | 100 | 800 to 1600 | C |
| 119-123 | Wypall ® X60 White | 100 | 800 to 1300 | A |
| 124-129 | Wypall ® X60 White | 300 | 900 to 1800 | A |

[1]Pattern A is a striped pattern having a total bond area of 4.7%. Pattern B is a striped pattern having a total bond area of 10.7%. Pattern C is a dot pattern having a total bond area of 5.9%.

Physical properties of several of the 2-ply and 3-ply samples were then tested. The results are shown below in Tables 3-4.

TABLE 3

Oil Absorbency and Peel Strength for 3-Ply Samples

| Sample No. | Line Speed (m/min) | Force (N) | Anvil Roll Pattern[1] | Oil Capacity (%) | Oil Rate (sec) | Avg. CD Peel Strength (g) | Avg. MD Peel Strength (g) |
|---|---|---|---|---|---|---|---|
| 1 | 100 | 1250 | C | 493.0 | 9.7 | 72.7 | 87.0 |
| 5 | 50 | 1800 | A | — | 7.2 | 59.4 | 61.2 |
| 8 | 150 | 2000 | A | 402.1 | 5.3 | 34.0 | 57.9 |
| 9 | 100 | 1300 | B | 455.2 | 9.3 | 265.8 | 182.8 |

TABLE 4

Oil Absorbency and Peel Strength for 2-Ply Samples

| Sample No. | Line Speed (m/min) | Force (N) | Anvil Roll Pattern[1] | Oil Capacity (%) | Oil Rate (sec) | Avg. CD Peel Strength (g) | Avg. MD Peel Strength (g) |
|---|---|---|---|---|---|---|---|
| 41 (Primere ™) | 100 | 800 | A | 463.5 | 9.5 | 16.5 | 49.6 |
| 44 (Primere ™) | 100 | 1100 | A | — | 8.2 | 100.7 | 139.3 |
| 46 (Primere ™) | 100 | 1300 | A | 444.9 | 8.1 | 175.7 | 193.2 |
| 48 (Primere ™) | 300 | 900 | A | 446.9 | 8.3 | 15.4 | 28.0 |
| 49 (Primere ™) | 300 | 1200 | A | 448.4 | 6.8 | 43.4 | 81.7 |
| 51 (Primere ™) | 300 | 1500 | A | 464.9 | 6.2 | 102.4 | 101.3 |
| 84 (X70) | 100 | 1100 | A | 333.6 | 10.0 | 32.3 | 31.7 |
| 88 (X70) | 100 | 1500 | A | 319.8 | 10.1 | 75.0 | 96.7 |
| 92 (X70) | 300 | 1800 | A | 346.6 | 9.5 | 53.4 | 55.8 |
| 119 (X60) | 100 | 800 | A | — | 9.9 | 67.4 | 25.4 |
| 121 (X60) | 100 | 1000 | A | 412.2 | 8.0 | 99.5 | 161.5 |
| 125 (X60) | 300 | 1000 | A | 410.0 | 8.7 | 35.2 | 32.4 |
| 128 (X60) | 300 | 1500 | A | — | 13.7 | 78.1 | 77.9 |
| 28 (Primere ™) | 100 | 600 | C | 446.3 | 19.4 | 4.3 | 8.5 |
| 30 (Primere ™) | 100 | 800 | C | — | 21.9 | 32.9 | 41.4 |
| 31 (Primere ™) | 100 | 900 | C | — | 22.7 | 54.8 | 69.5 |
| 33 (Primere ™) | 300 | 900 | C | — | 19.1 | 7.9 | 22.4 |
| 35 (Primere ™) | 300 | 1100 | C | — | 23.7 | 33.8 | 49.0 |
| 39 (Primere ™) | 300 | 1500 | C | — | 17.4 | 62.1 | 72.7 |
| 69 (X70) | 100 | 1000 | C | 326.6 | 25.1 | 6.4 | 18.4 |
| 74 (X70) | 300 | 1400 | C | — | 30.2 | 22.2 | 26.5 |
| 77 (X70) | 300 | 1800 | C | 318.9 | 28.1 | 37.3 | 56.3 |
| 105 (X60) | 100 | 600 | C | — | 20.1 | 5.5 | 15.3 |
| 109 (X60) | 100 | 1000 | C | — | 22.2 | 98.8 | 138.3 |
| 112 (X60) | 300 | 1000 | C | — | 20.5 | 24.4 | 34.5 |
| 114 (X60) | 300 | 1200 | C | — | 22.4 | 44.9 | 83.3 |
| 13 (Primere ™) | 100 | 1185 | B | — | 16.9 | 53.6 | 72.4 |
| 17 (Primere ™) | 100 | 1585 | B | — | 19.8 | 168.1 | 261.3 |
| 23 (Primere ™) | 300 | 1585 | B | — | 14.7 | 11.8 | 30.1 |
| 25 (Primere ™) | 300 | 1795 | B | 458.0 | 16.8 | 55.5 | 64.2 |
| 27 (Primere ™) | 300 | 1985 | B | — | 16.7 | 87.8 | 125.5 |
| 93 (X60) | 100 | 985 | B | — | 14.8 | 8.2 | 19.5 |
| 97 (X60) | 100 | 1385 | B | 439.2 | 18.3 | 85.0 | 71.2 |
| 101 (X60) | 100 | 1785 | B | — | 20.7 | 198.1 | 148.4 |
| 53 (X70) | 100 | 1335 | B | — | 22.1 | 8.8 | 11.5 |
| 57 (X70) | 100 | 1785 | B | — | 30.1 | 27.0 | 33.0 |
| 60 (X70) | 100 | 2485 | B | 323.1 | 25.6 | 123.8 | 124.2 |
| 63 (X70) | 300 | 1785 | B | — | 92.9 | 2.3 | 4.6 |
| 66 (X70) | 300 | 2285 | B | — | 18.4 | 19.7 | 33.3 |

As indicated, the 3-ply samples achieved good absorbency and peel strength properties. For example, of the samples set forth above, Sample 1 exhibited the highest absorbent capacity, i.e., 493.0%, and also achieved good peel strength values.

In addition, various 1-ply samples were also provided for comparison. Specifically, one sample was a single ply wiper commercially available from Kimberly-Clark Corp. under the name Wypall® X80 Orange. The Wypall® X80 Orange wiper had a basis weight of 125 gsm and contained a polypropylene spunbond web (22.7 gsm) hydraulically entangled with northern softwood kraft fibers. Another sample was a "TufPro Rental Shop Towel", which is commercially available from Tufco, Inc. of Green Bay, Wis. and believed to be a single-ply wiper having a basis weight of approximately 207 gsm.

Various properties of the 1-ply samples were tested and compared to 2-ply and 3-ply samples formed in the manner described above. The results are set forth below in Table 5.

TABLE 5

Properties of Samples

| Sample | Basis Weight (gsm) | Caliper (inches) | Liquid Intake Rates (avg. seconds) | | Absorption Capacity (grams) | | Taber Abrasion (cycles) | | Drape Stiffness (cm) | | Grab Tensile Strength (lbs) | |
|---|---|---|---|---|---|---|---|---|---|---|---|---|
| | | | $H_2O$ | Motor Oil | $H_2O$ | Motor Oil | Dry | Wet | CD | MD | CD Dry | MD Dry |
| 3-ply[1] | 164.0 | 0.038 | 0.90 | 16.6 | 7.00 | 7.30 | 305.2 | 721.4 | 3.53 | 5.97 | 29.91 | 42.02 |
| 3-ply[2] | 176.2 | 0.045 | 1.81 | 12.7 | 10.10 | 8.60 | 401.0 | 460.6 | 3.83 | 4.90 | 15.54 | 34.77 |
| 2-ply[3] | 137.1 | 0.031 | 1.07 | 30.5 | 7.30 | 5.80 | 115.4 | 162.0 | 2.72 | 5.63 | 11.05 | 22.17 |
| 2-ply[4] | 134.3 | 0.030 | 1.52 | 32.6 | 6.90 | 5.50 | 212.0 | 239.8 | 2.92 | 5.05 | 16.45 | 25.08 |

TABLE 5-continued

| | | | Properties of Samples | | | | | | | | |
|---|---|---|---|---|---|---|---|---|---|---|---|
| | Basis Weight | Caliper | Liquid Intake Rates (avg. seconds) | | Absorption Capacity (grams) | | Taber Abrasion (cycles) | | Drape Stiffness (cm) | | Grab Tensile Strength (lbs) |
| Sample | (gsm) | (inches) | H$_2$O | Motor Oil | H$_2$O | Motor Oil | Dry | Wet | CD | MD | CD Dry | MD Dry |
| 1-ply (X-80) | 132.9 | 0.023 | 1.49 | 80.8 | 4.70 | 4.10 | 215.6 | 293.8 | 2.10 | 3.68 | 23.65 | 16.02 |
| 1-ply ("Tufpro Rental Shop Towel") | 207.0 | 0.042 | 180.00 | 27.5 | 6.70 | 10.00 | N/A | 285-318 | 1.50 | 1.57 | 35.10 | 39.40 |

[1] As described above, this 3-ply sample was formed from nonwoven composite outer plies (30% spunbond/70% pulp, 64 gsm) and contained a bonded carded web (100% polypropylene, 45 gsm) as the inner ply.
[2] As described above, this 3-ply sample was formed from nonwoven composite outer plies (30% spunbond/70% pulp, 64 gsm) and contained a spunbond web (100% polypropylene, 30 gsm) as the inner ply.
[3] As described above, each ply of this 2-ply sample was formed from a wiper available from Kimberly-Clark Corp. under the name Primere ™.
[4] As described above, each ply of this 2-ply sample was formed from a wiper available from Kimberly-Clark Corp. under the name Wypall ® X60 Blue.

As indicated, the 3-ply samples provided excellent absorbency properties, measured by both absorption rate and absorbent capacity for both water and oil. The 3-ply samples also provided improved good strength and tactile properties.

While the invention has been described in detail with respect to the specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A method for forming a multi-ply fabric, said method comprising:
    positioning at least one inner ply between a first outer ply and a second outer ply, said first outer ply and said second outer ply each comprising a nonwoven composite material that includes thermoplastic fibers and absorbent staple fibers, said absorbent staple fibers constituting greater than about 50 wt. % of said nonwoven composite material, wherein said absorbent staple fibers and said thermoplastic fibers of said nonwoven layer are hydraulically entangled, said inner ply comprising a nonwoven layer formed from approximately 100 wt. % thermoplastic polyolefin fibers comprising polypropylene, polyethylene, or combinations thereof; and
    ultrasonically laminating together said inner ply, said first outer ply, and said second outer ply, wherein the ultrasonically lamination forms bonded regions and imparts a patterned surface texture to at least one side of the multi-ply fabric,
    wherein pores are created at a surface of the fabric at the bonded regions and voids are created throughout a direction perpendicular to the surface of the fabric, the pores and voids allow liquids to enter the fabric at the surface of the bonded region and to travel laterally through the bonded region to the inner ply of the fabric between the bonded regions.

2. A method as defined in claim 1, wherein said nonwoven layer of said inner ply has a basis weight of from about 10 to about 200 grams per square meter.

3. A method as defined in claim 1, wherein said nonwoven composite material of said first outer ply, said second outer ply, or combinations thereof, comprises less than about 50 wt. % of said thermoplastic fibers.

4. A method as defined in claim 1, wherein said nonwoven composite material of said first outer ply, said second outer ply, or combinations thereof, comprises from about 10 wt. % to about 40 wt. % of said thermoplastic fibers and from about 60 wt. % to about 90 wt. % of said absorbent staple fibers.

5. A method as defined in claim 1, wherein said absorbent staple fibers of said first outer ply, said second outer ply, or combinations thereof, are pulp fibers.

6. A method as defined in claim 1, wherein said thermoplastic fibers of said first outer ply, said second outer ply, or combinations thereof, are substantially continuous.

7. A method for forming a multi-ply fabric, said method comprising:
    positioning at least one inner ply between a first outer ply and a second outer ply, said first outer ply and said second outer ply each comprising a nonwoven composite material that includes a spunbond web formed from substantially continuous polyolefin fibers, said spunbond web being hydraulically entangled with pulp fibers, said pulp fibers constituting greater than about 50 wt. % of said nonwoven composite material, said inner ply comprising a spunbond nonwoven layer formed from approximately 100 wt. % thermoplastic polyolefin fibers comprising polypropylene, polyethylene, or combinations thereof; and
    ultrasonically laminating together said inner ply, said first outer ply, and said second outer ply, wherein the ultrasonically lamination forms bonded regions and imparts a patterned surface texture to at least one side of the multi-ply fabric,
    wherein pores are created at a surface of the fabric at the bonded regions and voids are created throughout a direction perpendicular to the surface of the fabric, the pores and voids allow liquids to enter the fabric at the surface of the bonded region and to travel laterally through the bonded region to the inner ply of the fabric between the bonded regions.

8. A method as defined in claim 7, wherein said thermoplastic polyolefin fibers of said spunbond nonwoven layer are substantially continuous.

9. A method as defined in claim 7, wherein said nonwoven composite material comprises from about 60 wt. % to about 90 wt. % of said pulp fibers.

10. A method as defined in claim 1, wherein said nonwoven layer of said inner ply consists of a spunbond nonwoven web of continuous thermoplastic polyolefin fibers.

11. A method as defined in claim 10, wherein said continuous thermoplastic fibers comprise polypropylene, polyethylene, or combinations thereof.

12. A method as defined in claim 10, wherein said continuous thermoplastic fibers comprise polypropylene.

13. A method as defined in claim 1, wherein said nonwoven layer of said inner ply consists of a carded web of thermoplastic polyolefin fibers.

14. A method as defined in claim 13, wherein said thermoplastic polyolefin fibers comprise polypropylene, polyethylene, or combinations thereof.

15. A method as defined in claim 13, wherein said thermoplastic polyolefin fibers comprise polypropylene.

16. A method as defined in claim 7, wherein said thermoplastic polyolefin fibers comprise polypropylene, polyethylene, or combinations thereof.

17. A method as defined in claim 7, wherein said continuous thermoplastic fibers comprise polypropylene.

18. A method for forming a multi-ply fabric, said method comprising:

positioning at least one inner ply between a first outer ply and a second outer ply, said first outer ply and said second outer ply each comprising a nonwoven composite material that includes a spunbond web formed from substantially continuous polyolefin fibers, said spunbond web being hydraulically entangled with pulp fibers, said pulp fibers constituting greater than about 50 wt. % of said nonwoven composite material, said inner ply comprising a carded nonwoven web formed from approximately 100 wt. % thermoplastic polyolefin fibers comprising polypropylene, polyethylene, or combinations thereof; and ultrasonically laminating together said inner ply, said first outer ply, and said second outer ply, wherein the ultrasonically lamination forms bonded regions and imparts a patterned surface texture to at least one side of the multi-ply fabric, wherein pores are created at a surface of the fabric at the bonded regions and voids are created throughout a direction perpendicular to the surface of the fabric, the pores and voids allow liquids to enter the fabric at the surface of the bonded region and to travel laterally through the bonded region to the inner ply of the fabric between the bonded regions.

19. A method as defined in claim 18, wherein said bonded carded nonwoven web is formed from approximately 100 wt. % polypropylene fibers.

* * * * *